US010923976B2

United States Patent
Herrada et al.

(10) Patent No.: US 10,923,976 B2
(45) Date of Patent: Feb. 16, 2021

(54) ROTOR OF ROTATING ELECTRICAL MACHINE AND ASSOCIATED FABRICATION PROCESS

(71) Applicant: Valeo Systèmes d'Essuyage, Le Mesnil Saint Denis (FR)

(72) Inventors: Jose-Luis Herrada, Le Mesnil Saint Denis (FR); Quentin Aubugeau, Chatellerault (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 16/234,696

(22) Filed: Dec. 28, 2018

(65) Prior Publication Data

US 2019/0207456 A1 Jul. 4, 2019

(30) Foreign Application Priority Data

Jan. 2, 2018 (FR) ...................................... 1850003

(51) Int. Cl.
*H02K 3/16* (2006.01)
*H02K 1/26* (2006.01)
(Continued)

(52) U.S. Cl.
CPC ................. *H02K 3/16* (2013.01); *H02K 1/26* (2013.01); *H02K 3/28* (2013.01); *H02K 3/51* (2013.01);
(Continued)

(58) Field of Classification Search
CPC .. H02K 3/16; H02K 3/28; H02K 1/26; H02K 13/00; H02K 13/003; H02K 15/09;
(Continued)

(56) References Cited

U.S. PATENT DOCUMENTS 3,705,459 A * 12/1972 Biddison ................ H02K 13/04
29/597
6,300,704 B1 * 10/2001 Maldener ............... H02K 13/04
29/598

(Continued)

FOREIGN PATENT DOCUMENTS

DE 102014217289 A1 3/2016

OTHER PUBLICATIONS

Preliminary Search Report in corresponding French Application No. 1850003, dated Jul. 31, 2018 (2 pages).
(Continued)

*Primary Examiner* — Burton S Mullins
(74) *Attorney, Agent, or Firm* — Osha Bergman Watanabe & Burton LLP

(57) ABSTRACT

The present invention relates to a rotor (1) of a rotary electric machine, comprising:
 a body (3) comprising a cylindrical central core (5) and a circumferential plurality of arms (B1 ... B18) extending radially out from the cylindrical central core (5), the body (3) being intended to be mounted with the ability to move about an axis of rotation X,
 a coilset produced by windings of turns and forming at least one series of coils (C1 ... C9, C1' ... C9', C1" ... C9", C1'" ... C9'"), a coil (C1 ... C9, C1' ... C9', C1" ... C9", C1'" ... C9'") comprising a predetermined number of turns around at least two arms (B1 ... B18) of the body, two adjacent coils (C1 ... C9, C1' ... C9', C1" ... C9", C1'" ... C9'") of a series being angularly offset from one another with a partial overlap,
in which the rotor (1) comprises at least one additional retaining loop (S1, S1', S2, S2') wound around at least two arms (B1 ... B18) of which at least one is common to the arms (B1 ... B18) around which is wound the last coil (C9, C9', C9", C9'"), situated radially outermost, of at least one
(Continued)

series and of which at least one is distinct from the arms around which the said last coil (C9, C9', C9", C9'") is wound, so that the at least one additional retaining loop (S1, S1', S2, S2') partially overlaps the turns of the said last coil (C9, C9', C9", C9'").

9 Claims, 15 Drawing Sheets

(51) Int. Cl.
     *H02K 15/09*       (2006.01)
     *H02K 3/28*        (2006.01)
     *H02K 3/51*        (2006.01)
     *H02K 23/30*       (2006.01)
     *H02K 13/00*       (2006.01)

(52) U.S. Cl.
     CPC ........... *H02K 13/003* (2013.01); *H02K 15/09* (2013.01); *H02K 23/30* (2013.01)

(58) Field of Classification Search
     CPC ........ H02K 23/30; H02K 23/34; H02K 23/26; H02K 3/48; H02K 3/50; H02K 3/26
     USPC .......... 310/261.1, 264; 29/597–598; 242/440
     See application file for complete search history.

(56) References Cited

U.S. PATENT DOCUMENTS

2011/0050025 A1    3/2011  Doushita et al.
2014/0368078 A1  12/2014  Odani et al.
2016/0065022 A1*  3/2016  Huber ..................... H02K 3/50

OTHER PUBLICATIONS

First Office Action in corresponding Chinese Application No. 201910001747.1, dated Jul. 7, 2020 (12 pages).

* cited by examiner

ROTOR OF ROTATING ELECTRICAL MACHINE AND ASSOCIATED FABRICATION PROCESS

The present invention relates to a rotary electric machine, notably to an electric motor, intended to be used in a motor vehicle, for example in a geared motor unit, and more particularly to a rotary electric machine comprising a wound rotor.

It is known practice to use wound rotors in certain electric motors. These wound rotors generally comprise a body, made of a stack of laminations, comprising arms around which turns are wound to form coils intended to interact with the poles of the stator which may be produced using magnets or using coils. The application of power to the coils of the rotor allows interaction with the poles of the stator in order to turn the rotor. The application of power to the rotor is achieved for example using brushes.

The various coils of the rotor are angularly offset from one another and may notably be superposed. In that case, the turns of the last coil are wound and held around the end of the arms in such a way that there is a not-insignificant risk of a turn slipping off during the life of the rotary machine, potentially leading to a malfunctioning of the latter. Specifically, the diameter of the rotor needs to be limited as far as possible so as to limit the size of the rotary machine (to make it easier to use in the vehicle), and this is why the size of the arms cannot be increased in order to prevent the turns slipping off.

The present invention therefore seeks to provide a solution that makes it possible to prevent the last turns of a coil of a rotor from slipping off, without increasing the diameter of the rotor.

To this end, the present invention relates to a rotor of a rotary electric machine, comprising:
 a body comprising a cylindrical, central core and a circumferential plurality of arms extending radially out from the cylindrical central core, the body being intended to be mounted with the ability to move about an axis of rotation X,
 a coil produced by windings of turns and forming at least one series of coils, a coil comprising a predetermined number of turns around at least two arms of the body, two adjacent coils of a series being angularly offset from one another with a partial overlap, in which the rotor comprises at least one additional retaining loop wound around at least two arms of which at least one is common to the arms around which is wound the last coil, situated radially outermost, of at least one series and of which at least one is distinct from the arms around which the said last coil is wound, so that the at least one additional retaining loop partially overlaps the turns of the said last coil.

The rotor may also have one of the following additional aspects:

The additional retaining loop is an additional retaining turn of at least one series of coils.

The rotor may comprise at least two series of coils arranged at 180° with respect to one another with respect to the axis of rotation X.

One single series of coils comprises at least one additional retaining turn partially overlapping the turns of the last coils of the two series.

The two series of coils each comprise at least one additional retaining turn.

The at least one additional retaining turn of at least one series of coils is produced between a plurality of arms of which at least one is an arm around which the last coil of the series of coils is wound, and at least one is an arm around which the last coil of the other series of coils is wound, the at least one additional retaining turn of the series of coils partially overlapping the turns of the last coils of the series of coils. The at least one additional retaining turn extends in a direction substantially equal to an angle of 360° divided by the number of poles of the rotary machine with respect to the direction of the turns of the last coil of the series, namely in a direction substantially perpendicular to the direction of the turns of the last coil in a machine comprising four poles.

The at least one additional retaining turn is wound around a plurality of arms of the body covering an angle substantially equal to 180°.

The at least one additional retaining turn is wound between arms of the body of which one is adjacent to the arms of the body around which the last coil of the series is wound and the other arms are common to the arms of the body around which the said last coil is wound.

The at least one turn is wound in the direction of winding corresponding to an increase in motor torque.

The arms of the body have the overall shape of a T of which the base is directed towards the axis of rotation X and of which the free end forms two salient turn-retention returns.

The rotor is configured to collaborate with a stator of the rotary electric machine comprising a number of poles greater than or equal to four.

The angle covered by the arms around which a coil is wound is substantially equal to 360° divided by the number of poles of the stator of the rotary electric machine.

The body comprises at least ten arms.

The body comprises eighteen arms, a coil being formed by turns wound around four arms of the body.

The number of turns in the coils is 30 turns.

The rotor comprises a slip-ring provided with a plurality of terminals and configured to supply power to the coils of the rotor and the additional retaining loop is a connecting wire connecting two terminals of the slip-ring.

The present invention also relates to a rotary electric machine comprising a rotor as described hereinabove.

The present invention also relates to a method of manufacturing a rotor of a rotary electric machine comprising a body comprising a cylindrical central core and a circumferential alternation of arms extending radially out from the cylindrical central core, the body being intended to be mounted with the ability to move about an axis of rotation X, the method comprising:
 a succession of steps of winding a predetermined number of turns of a coilset around at least two arms of the body to form at least one series of coils, the winding steps being performed in such a way that two adjacent coils of a series are wound around at least one common arm and at least one distinct arm, two adjacent coils of a series being angularly offset from one another with a partial overlap,
 an additional step of winding at least one coil retaining turn around at least two arms of the body, of which arms at least one is common to the arms around which is wound the last coil of a series, situated radially outermost, and the other arm is distinct from the arms around which the last coil of the series is wound, the said at least one retaining turn partially overlapping the turns of the said last coil.

The method may also have the following additional aspect:

The successive winding steps are performed in duplicate and simultaneously at a first place on the body and at a second place on the body that is diametrically opposite the first place so as to form two series of coils which are symmetric about the axis of rotation X.

Further features and advantages of the invention will become more clearly apparent from reading the following description, given by way of example and in no way limiting, in reference to the appended drawings, in which.

In all the figures, elements that are identical bear the same reference numbers.

The following embodiments are examples. Although the description refers to one or more embodiments, this does not necessarily mean that each reference relates to the same embodiment, or that the features apply only to just one embodiment. Single features of various embodiments can also be combined or interchanged in order to create other embodiments.

Figure 1:
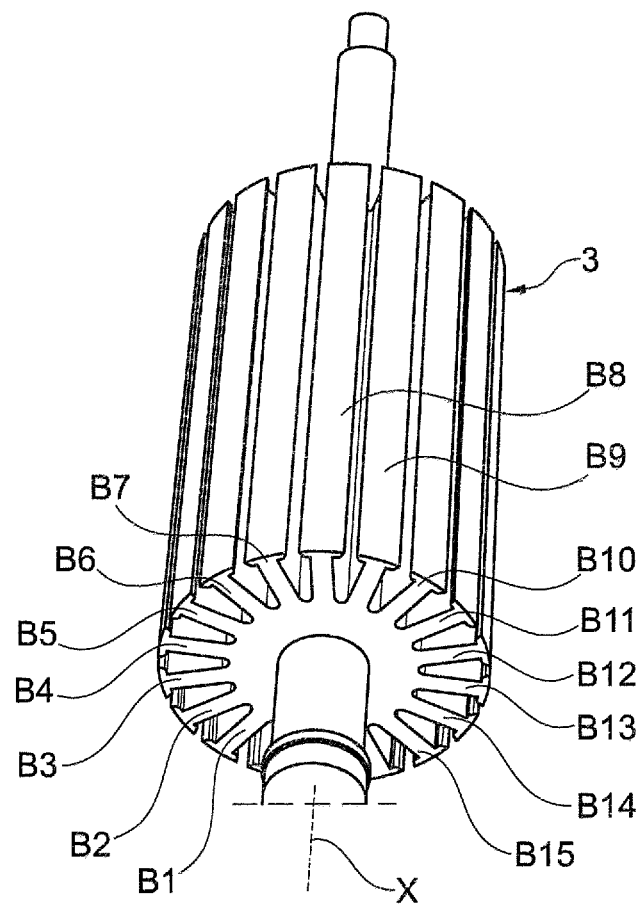
FIG. 1 is a schematic perspective view of a rotor body.

FIG. 1 is a schematic perspective view of a body 3 of a rotor 1 of a rotary machine such as an electric motor. In the context of the present invention, the rotary machine comprises at least four poles arranged at the stator (not depicted). The poles are for example produced using permanent magnets or using coils. The body 3 has a cylindrical overall shape and is intended to accept one or more series of coils distributed around its periphery. The body 3 is intended to be mounted with the ability to move about an axis of rotation X corresponding to the central axis of the cylinder.

The body 3 comprises a cylindrical central core 5 and a circumferential plurality of arms, eighteen of these in this instance, denoted B1, B2 . . . B18 (arms B16, B17 and B18 being hidden in FIG. 1), which means to say a plurality of arms are arranged on the circumference of the cylindrical central core 5, extending radially out from the cylindrical central core 5. The arms B1 . . . B18 are evenly distributed around the entire circumference of the cylindrical central core 5 and are separated by notches intended to accept windings of turns of the coilset. Of course, the invention is not restricted to an even distribution of the arms B1 . . . B18 of the rotor 3. In this instance, the body 3 comprises 18 arms, but the invention is not restricted to this number of arms but to any number, preferably higher than 10. In addition, the number of poles of the motor may be different from four.

Figure 2:
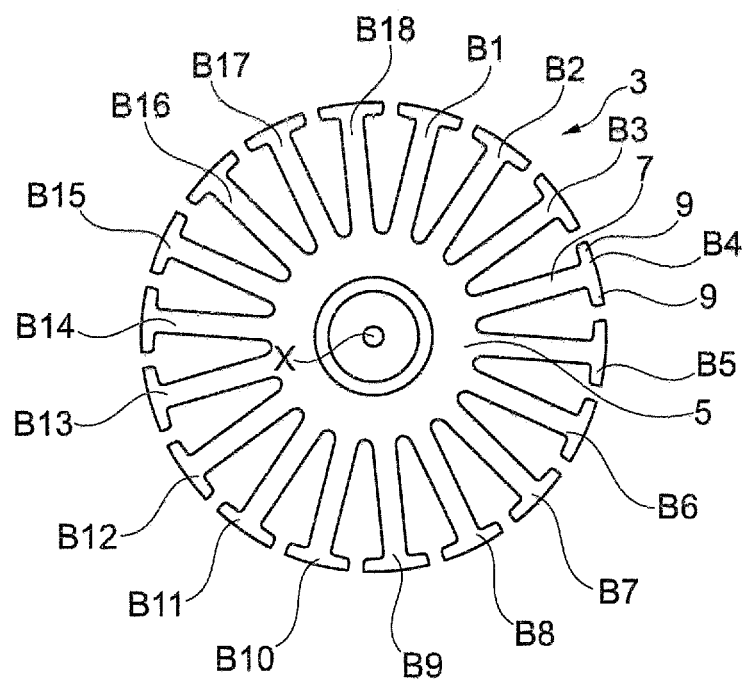
FIG. 2 is a schematic view on the axis of rotation X of a rotor body.

As is best visible in FIG. 2 which depicts a view on the axis of rotation X of the body 3, the arms B1 . . . B18 of the body 3 have for example the overall shape of a T of which the base 7 is directed towards the axis of rotation X and of which the free end forms two salient returns 9 which assist with turn retention.

The body 3 is formed for example of a bundle of laminations assembled with one another, each lamination corresponding to one "slice" of the body 3 comprising a cylindrical central core 5 and a plurality of arms B1 . . . B18. However, other types of body 3, for example one-piece bodies, are equally possible.

Figure 3:
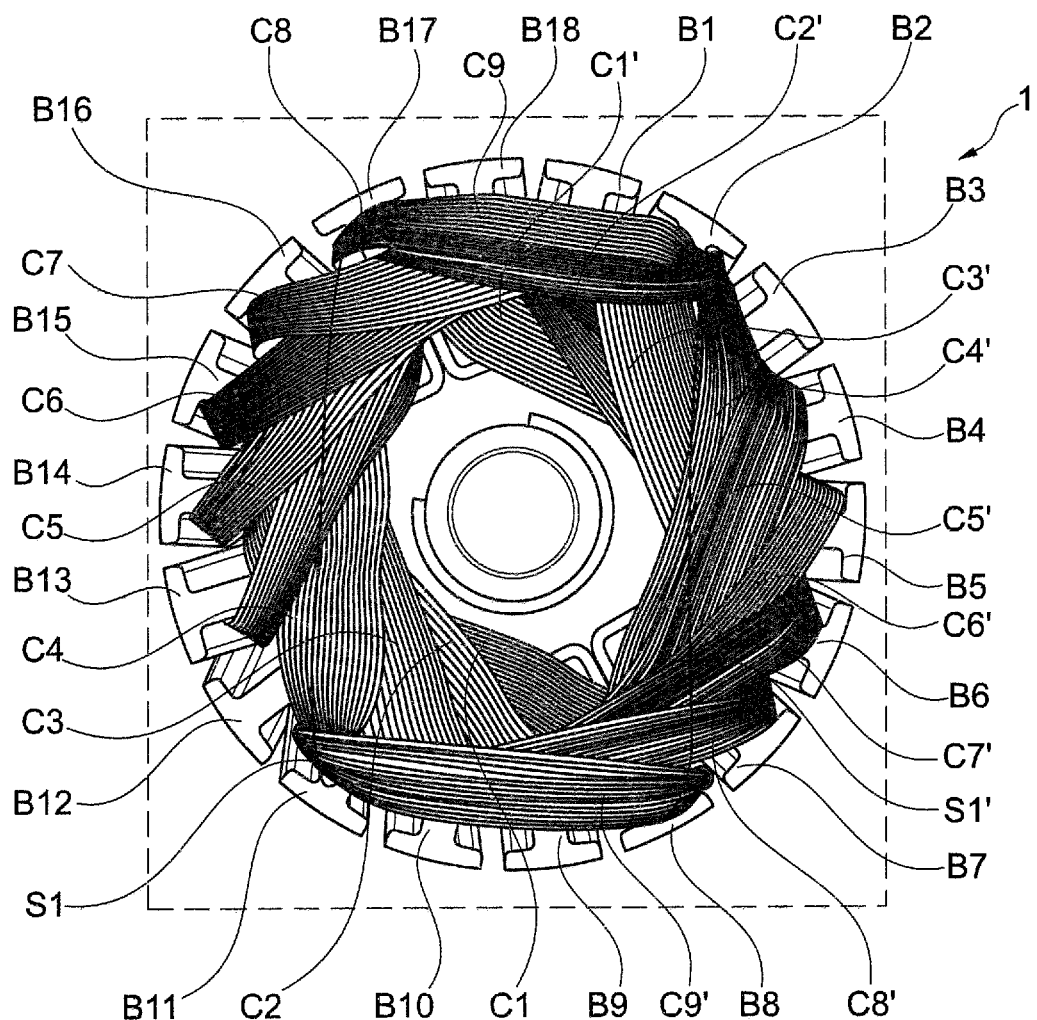
FIG. 3 is a diagram of a wound rotor according to a first embodiment.
Figure 4:
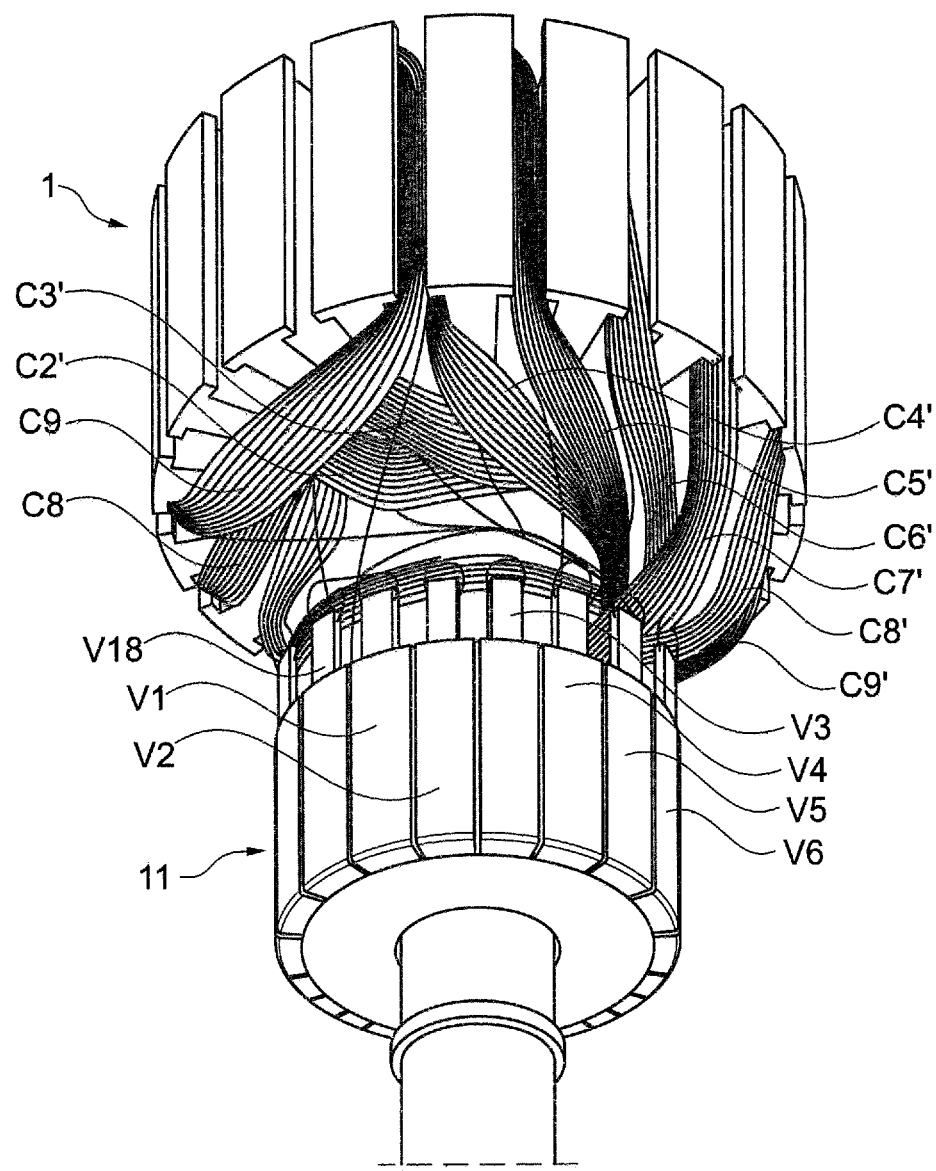
FIG. 4 is a diagram of the wound rotor of FIG. 3, viewed from the slip-ring side.

FIG. 3 depicts a diagram of a rotor 1 the winding of which comprises two series of coils C1 . . . C9 and C1' . . . C9' distributed on the arms B1 . . . B18 of the body 3. A coil is produced by a plurality of turns wound around two arms B1 . . . B18 of the body and produced from a single wire. The wire is, for example, a copper wire. The rotor 1 also comprises a slip-ring 11 allowing the coils to be supplied with power as depicted in FIG. 4. FIG. 4 depicts the rotor 1 of FIG. 3 seen from the side of the slip-ring 11, the two ends of a coil C1 . . . C9' are respectively connected to a predefined terminal of a slip-ring 11 so as to allow the coil to be supplied with power at the desired moment so as to turn the rotor 1. The slip-ring 11 comprises, for example, eighteen terminals denoted V1 . . . V18, against which brushes (not depicted) rub in order to supply power to the coils C1 . . . C9'. A first brush corresponds to a positive power supply and a second brush to a negative power supply such that when the first brush is in contact with a first terminal, for example V1 and the second brush is in contact with a second terminal, for example V5, the coils connected in series between V1 and V5 are powered. There are various possible configurations regarding the connections of the coils C1 . . . C9' to the terminals V1 . . . V18 of the slip-ring 11 in order to operate the electric motor.

Figure 13:
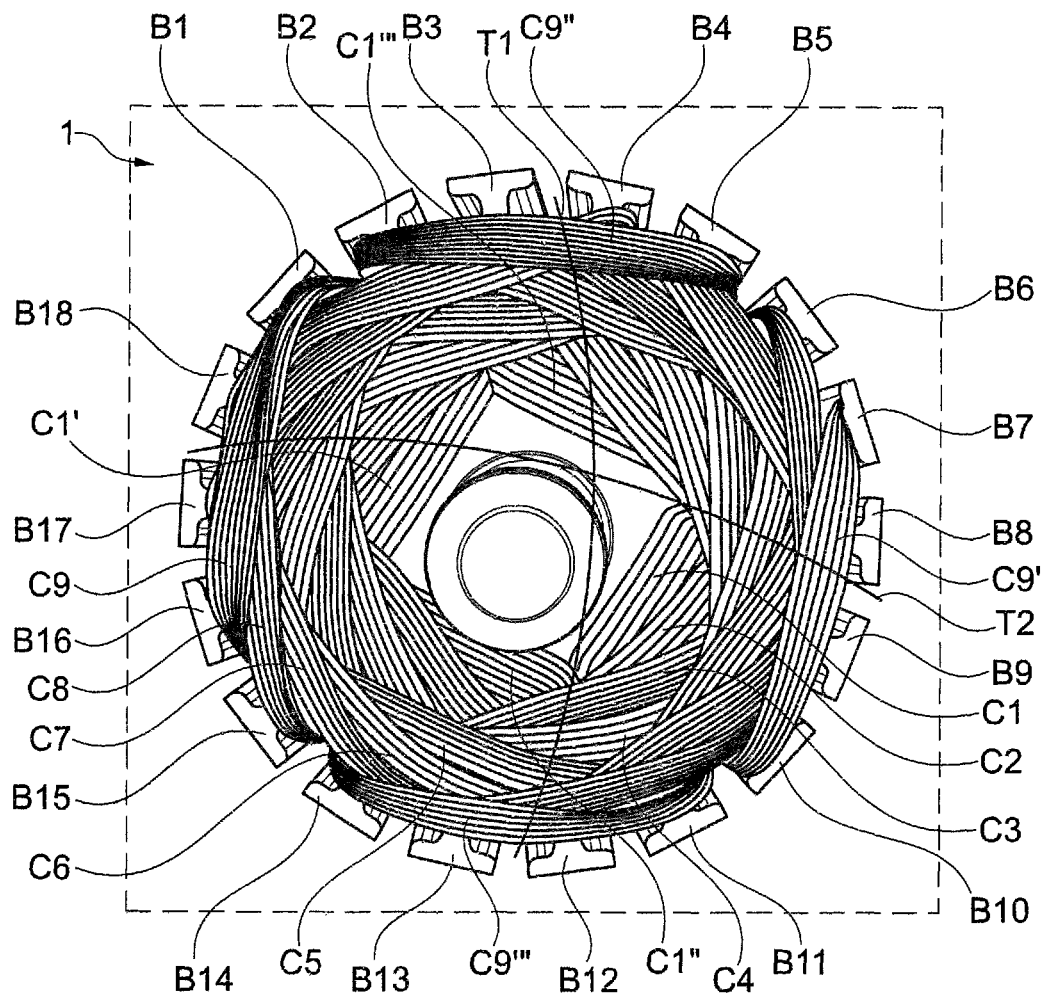
FIG. 13 is a diagram of a wound rotor according to a tenth embodiment.
Figure 14:
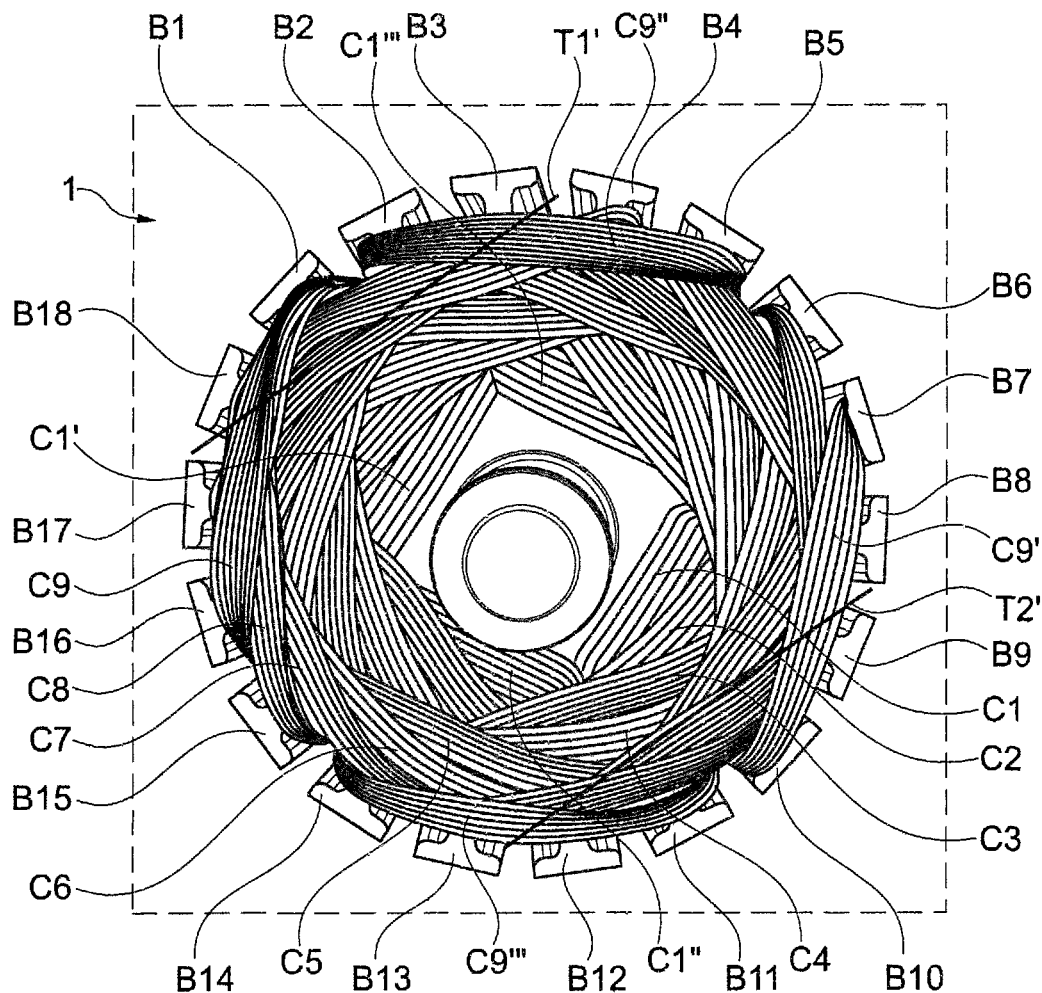
FIG. 14 is a diagram of a wound rotor according to an eleventh embodiment.

However, it should be noted that the present invention is not restricted to a rotor comprising two series of coils but extends to rotors 1 comprising a different number of series of coils, for example four series of coils arranged 90° apart, as depicted in FIGS. 13 and 14. For the sake of clarity, some of the coils in FIGS. 13 and 14 have not been referenced. The coils C1' . . . C9' of the second series are situated facing the coils of the first series C1 . . . C9 as in the embodiment of FIG. 3, but the rotor 1 also comprises a fourth series C1''' . . . C9''' situated facing the third series C1'' . . . C9'', the various series being positioned 90° apart.

The use of a rotor 1 comprising two diametrically opposed series of coils makes it possible to obtain a rotor 1 that is better balanced (as compared with a rotor 1 comprising a single series of coils) because the positions of the coils of the two series are symmetrical about the axis of rotation and do not therefore create any additional imbalance.

The number of series of coils is notably dependent on the number of poles of the rotary machine. The various series of coils may be produced simultaneously if the machine performing the winding steps comprises several winding arms, thereby making it possible to form the coilset of the rotor 1 more rapidly.

The series of coils may also be produced in alternation if the machine has just one turn winding arm. In the latter instance, the first coils C1, C1', C1", C1''' of each of the series are wound, followed by the second coils C2, C2', C2", C2''' of each of the series, and so on, up to the last coils C9, C9', C9", C9''' of each series. The number of series of coils is notably dependent on the number of poles. In general, the number of series of coils is equal to one or to the number of poles or to half the number of poles. Hence, for a motor comprising four poles, the number of series of coils is one, two or four.

In the scenario of FIG. 3, the two series of coils are substantially identical, and are positioned 180° apart, which means to say that one coil, for example the first coil C1 of the first series is situated opposite the same coil, in our example the first coil C1', of the other series. In this instance, each of the series forms a set of nine coils respectively denoted C1, C2 . . . C9 in the case of the first, and C1', C2' . . . C9' in the case of the second, series. However, it is equally possible to have a different number of coils in each series. For preference, the various series have the same number of coils in order to keep the rotor 1 balanced.

A coil is therefore formed by a winding of a predetermined number of turns, for example 30 turns, around at least two arms of the body. The number of turns of the various coils is preferably the same for all the coils C1 . . . C9' of a series.

The number of arms around which a coil is wound is chosen to be substantially equal to the pole pitch, or slightly smaller. The pole pitch corresponds to an angle equal to 360° divided by the number of poles of the motor. In this case, the motor comprises four poles so the pole pitch is equal to 90°. Because the rotor 3 comprises eighteen arms, in order to obtain a coil that covers an angle of substantially 90°, it is necessary to choose a number of arms equal to four or five on which to wind the turns, and preferably equal to four so as to cover an angle smaller than the pole pitch.

In the scenario of FIG. 3, a coil C1 . . . C9' is therefore formed by a winding of turns around four arms, namely four arms of the body are arranged in the middle of the turns of a coil C1 . . . C9', the windings being performed in the notches adjacent to those two of the four arms that are most distantly spaced. However, the coils C1 . . . C9' may equally be wound around a number of arms other than four.

Thus, the turns that form the coil C1 are wound around the arms B9, B10, B11 and B12, whereas the turns of the next coil C2 are wound around the arms B10, B11, B12 and B13 (an offset by one arm or 20° between two adjacent coils of one series). The turns of the coil C2 therefore overlap the turns of the coil C1 on the arms B10, B11, and B12. Thus, two adjacent coils of one series are angularly offset with respect to one another with a partial overlap. In addition, it should be noted that the direction of winding up the turns is the same for the various coils of a series (winding in a clockwise or anticlockwise direction for all the coils in the series). This direction is also the same for the various coils of different series. In this instance, the offset between two adjacent coils of one series corresponds to an offset by one arm, which corresponds to 20°. Because of the partial overlap, combined with the presence of two series arranged at 180° with respect to one another in this instance, the turns are positioned increasingly close to the periphery of the rotor 1 and to the salient returns 9 of the arms B1 . . . B18.

In order to prevent the turns of the last coil of a series, in this instance the coils C9 and C9', namely the coil in the series that is radially outermost, from slipping off, at least one additional retaining loop is wound around at least two arms of the body of which at least one is one of the arms around which the last coil of the series is wound and of which at least one is distinct from the arms around which the said last coil is wound.

According to a first embodiment, the retaining loop corresponds to an additional retaining turn of one of the series of coils C1 . . . C9'. Thus, the at least one additional retaining turn partially overlaps the turns of the last coil C9, C9'. The additional retaining turn may be wound in the same direction as or in a different direction from the direction of winding (clockwise or anticlockwise) of the turns of the coils of the series. The additional retaining turn or turns are wound in continuity with the last coil of the series so that if the last coil needs to be connected to a first and second predefined terminal of the slip-ring 11, the first end of the last coil is connected to the first terminal and the end of the additional turn or turns is connected to the second terminal.

In the case of FIG. 3, the coilset comprises an additional retaining turn which extends substantially perpendicular to the direction of the turns of the last coil C9, C9'. Specifically, the last coil C9 is wound around the arms B17, B18, B1 and B2, and the additional retaining turn S1 is wound around the arms B11, B12, B13, B14, B15, B16 and B17. A retaining turn extending in a direction substantially perpendicular to the direction of the turns of the last coil C9 allows effective retention of the turns of the last coil C9.

In addition, in the case of a rotor comprising two series of coils as in the case of FIG. 3, the additional turn is preferably wound in such a way as to partially overlap the two last coils C9 and C9'. The coil C9' is wound around the arms B8, B9, B10 and B11, and the last turn S1' of the second series of coils is wound around the arms B2, B3, B4, B5, B6, B7 and B8. Thus, the additional turns S1 and S1' each partially overlap the last coils C9 and C9' and therefore contribute to holding the turns of the last coils C9 and C9' in position. Preferably, the additional turns S1 and S1' respectively overlap a first and a second portion of the last coils C9, C9' corresponding, for example, to one side and the other side of the last coil C9, C9' in order to optimize retention of the last coils C9, C9'.

Alternatively, just one of the series of coils comprises one or more additional turn(s) and this or these additional turn(s) partially overlap the turns of the last coils of the two series of coils.

FIGS. 5 to 10 depict other possible configurations of the additional retaining turn. In all these configurations, the coils C1 . . . C9' are positioned in the same way as in FIG. 3 even if the number of the arms B1 . . . B18 around which the coils C1 . . . C9' are wound may differ.

Figure 5:
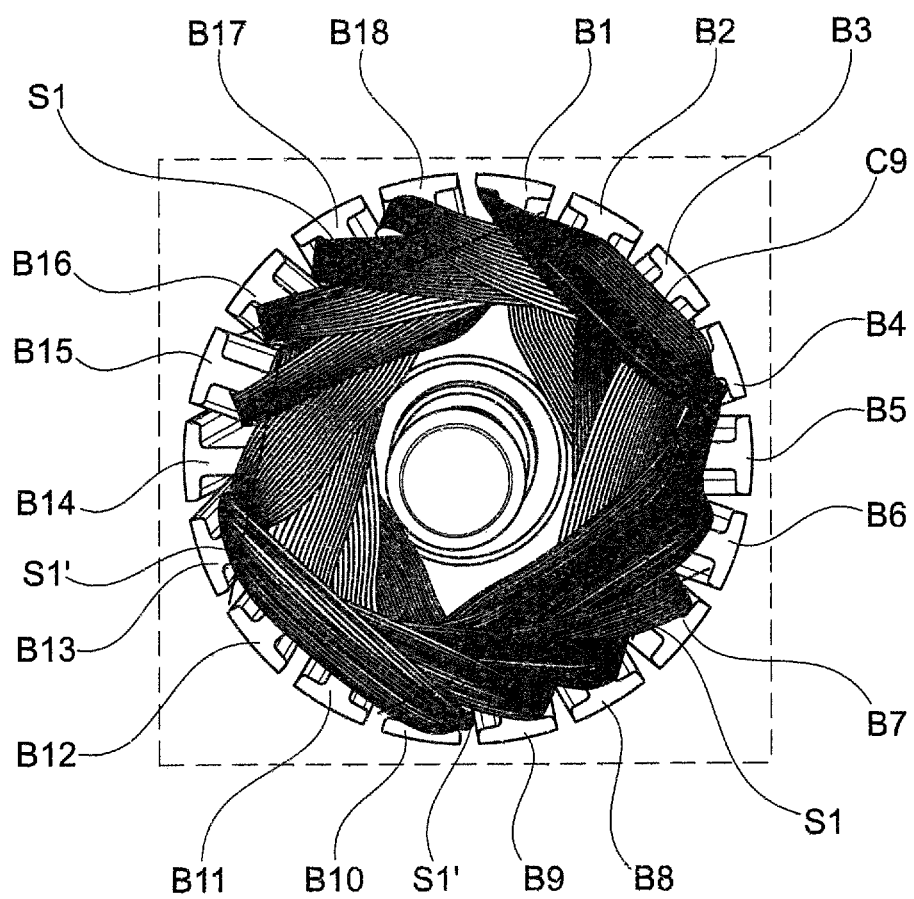
FIG. 5 is a diagram of a wound rotor according to a second embodiment.

FIG. 5 depicts a configuration in which the additional retaining turn is wound around four arms of the body 3. Thus, the last coil C9 is wound around the arms B1, B2, B3 and B4, and the additional retaining turn S1 associated with this last coil C9 and indicated by a line, extends between the arms B16, B17, B18 and B1. Alternatively, the additional retaining turn S1 may equally extend between the arms B4, B5, B6 and B7, as indicated schematically in dotted line.

Symmetrically, for the other series of coils, the last coil C9' is wound around the arms B10, B11, B12 and B13, and the additional retaining turn S1' associated with this last coil C9' is wound around the arms B13, B14, B15 and B16 or around the arms B7, B8, B9 and B10.

Figure 6:
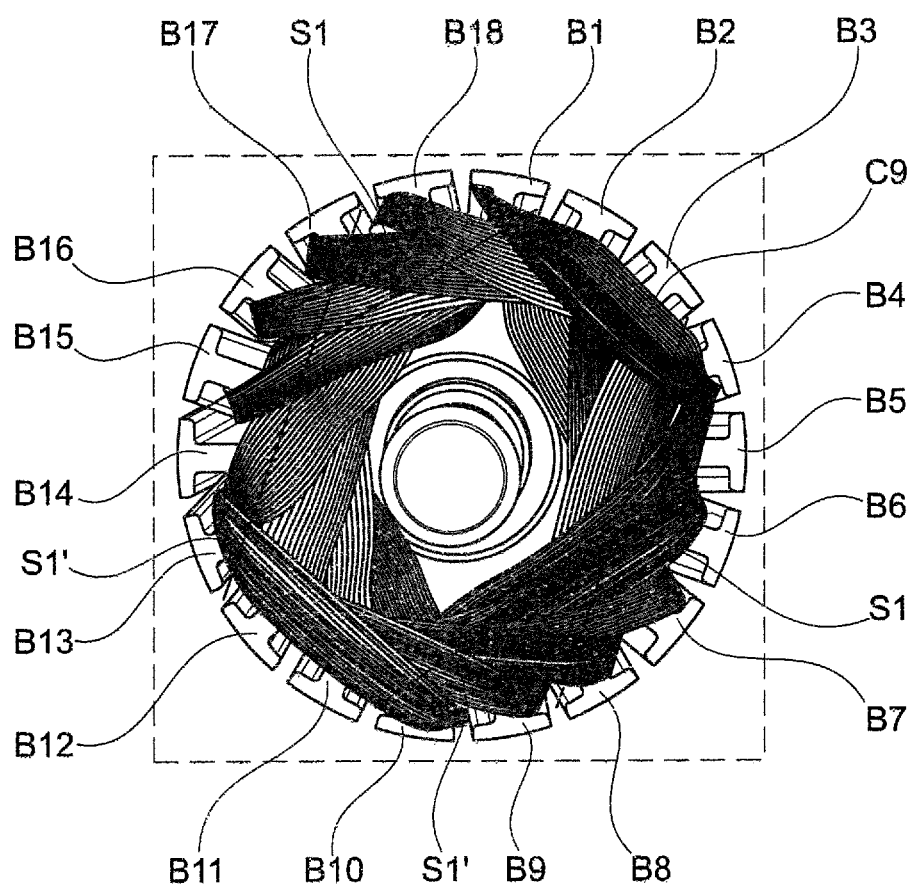
FIG. 6 is a diagram of a wound rotor according to a third embodiment.

FIG. 6 depicts a configuration in which the additional retaining turn is wound around five arms of the body 3. Thus, the last coil C9 is wound around the arms B1, B2, B3 and B4, and the additional retaining turn s1, indicated by a line, extends between the arms B15, B16, B17, B18 and B1.

Alternatively, the additional retaining turn s1 may equally extend between the arms B4, B5, B6, B7 and B8, as indicated schematically in dotted line.

Symmetrically, for the other series of coils, the last coil C9' is wound around the arms B10, B11, B12 and B13, and the additional retaining turn is wound around the arms B12, B13, B14, B15 and B16 or around the arms B7, B8, B9, B10 and B11.

Figure 7:
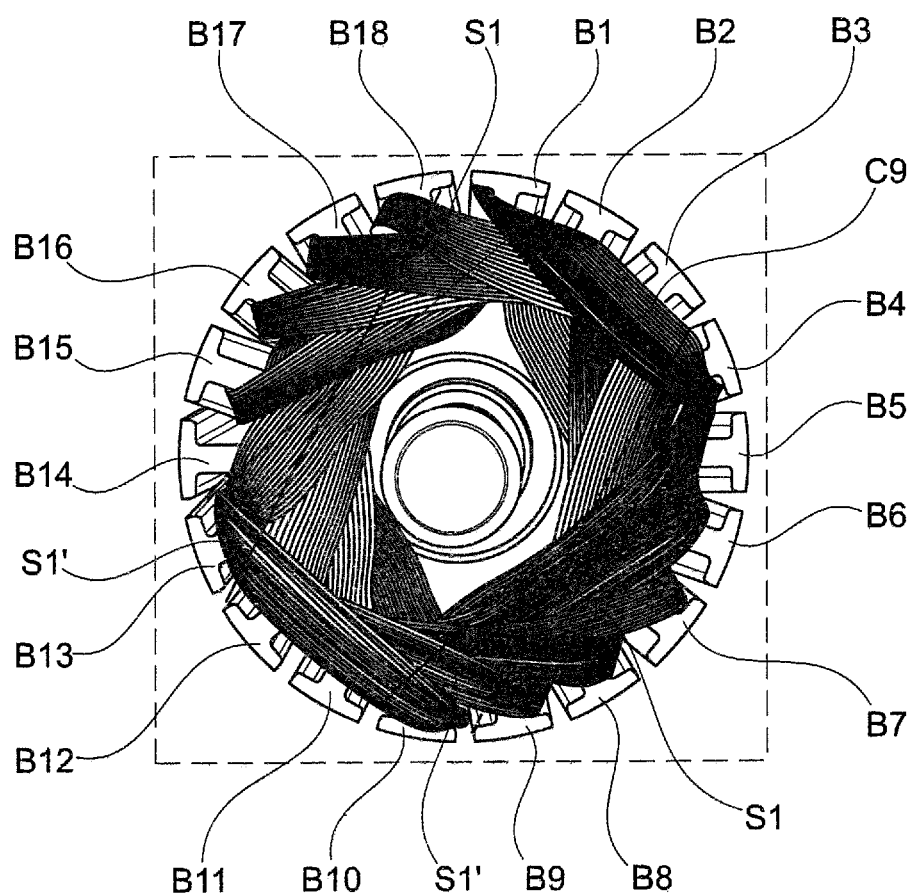
FIG. 7 is a diagram of a wound rotor according to a fourth embodiment.

FIG. 7 depicts a configuration in which the additional retaining turn is wound around six arms of the body 3. Thus, the last coil C9 is wound around the arms B1, B2, B3 and B4, and the additional retaining turn s1, indicated by a line, extends between the arms B14, B15, B16, B17, B18 and B1. Alternatively, the additional retaining turn s1 may equally be wound around the arms B4, B5, B6, B7, B8 and B9, as indicated schematically in dotted line.

Symmetrically, for the other series of coils, the last coil C9' is wound around the arms B10, B11, B12 and B13, and the additional retaining turn is wound around the arms B11, B12, B13, B14, B15 and B16 or around the arms B7, B8, B9, B10, B11 and B12.

Figure 8:
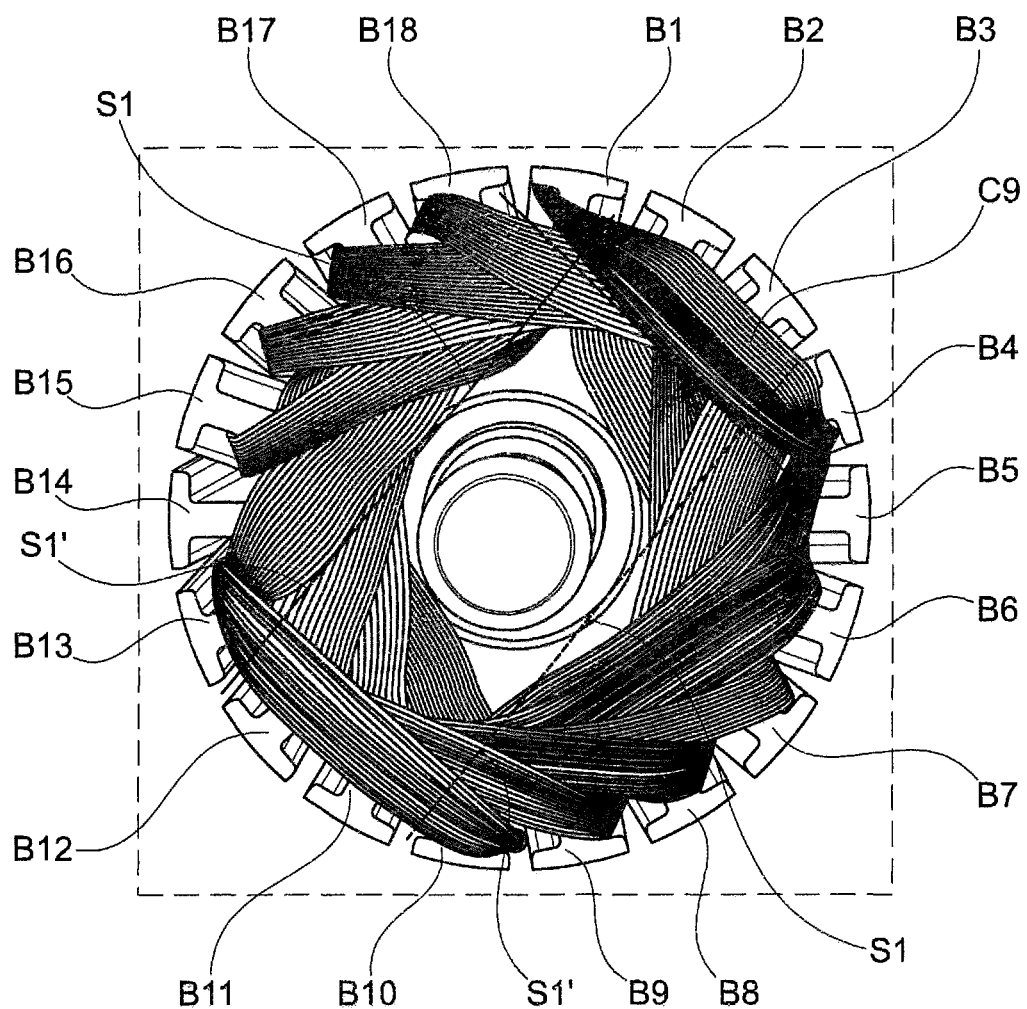
FIG. 8 is a diagram of a wound rotor according to a fifth embodiment.

FIG. 8 depicts a configuration in which the additional retaining turn is wound around seven arms of the body 3. Thus, the last coil C9 is wound around the arms B1, B2, B3 and B4, and the additional retaining turn s1 indicated by a line, extends between the arms B13, B14, B15, B16, B17, B18 and B1. Alternatively, the additional retaining turn s1 may equally extend between the arms B4, B5, B6, B7, B8, B9 and B10, as indicated schematically in dotted line.

For the other series of coils, the winding solutions for the additional retaining turn are the same as for the first series of coils. This then is the situation in which there are two additional retaining turns corresponding to the two positions described.

Figure 9:
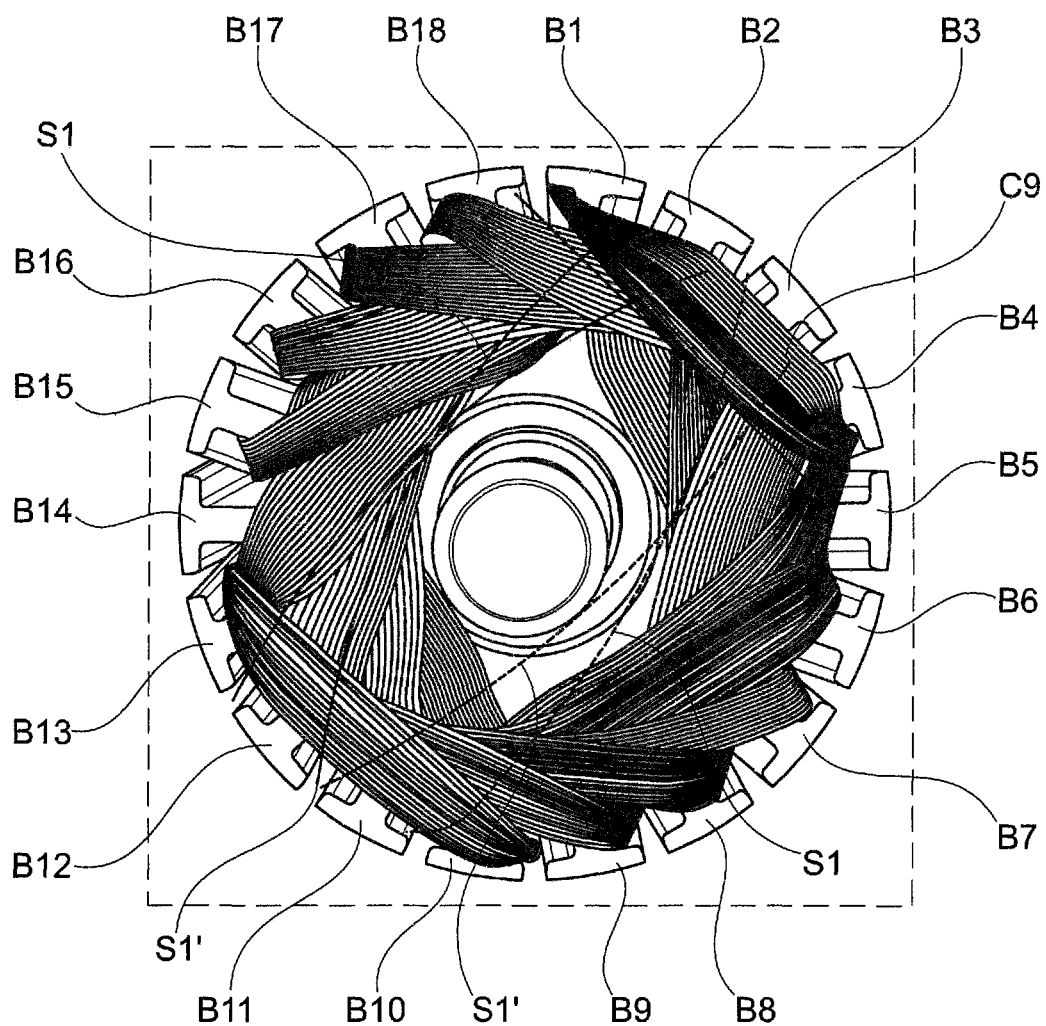
FIG. 9 is a diagram of a wound rotor according to a sixth embodiment.

FIG. 9 depicts a configuration in which the additional retaining turn is wound around eight arms of the body 3. Thus, the last coil C9 is wound around the arms B1, B2, B3 and B4, and the additional retaining turn s1 indicated by a line, extends between the arms B13, B14, B15, B16, B17, B18, B1 and B2. Alternatively, the additional retaining turn s1 may equally be wound around the arms B4, B5, B6, B7, B8, B9, B10 and B11, as indicated schematically in dotted line. Alternatively again, the additional retaining turn s1 may be wound around the arms B12, B13, B14, B15, B16, B17, B18 and B1 or alternatively still, around the arms B3, B4, B5, B6, B7, B8, B9 and B10.

For the other series of coils, the winding solutions for the additional retaining turn are the same as for the first series of coils. This then is the situation in which there are two additional retaining turns corresponding to two of the positions described.

Figure 10:
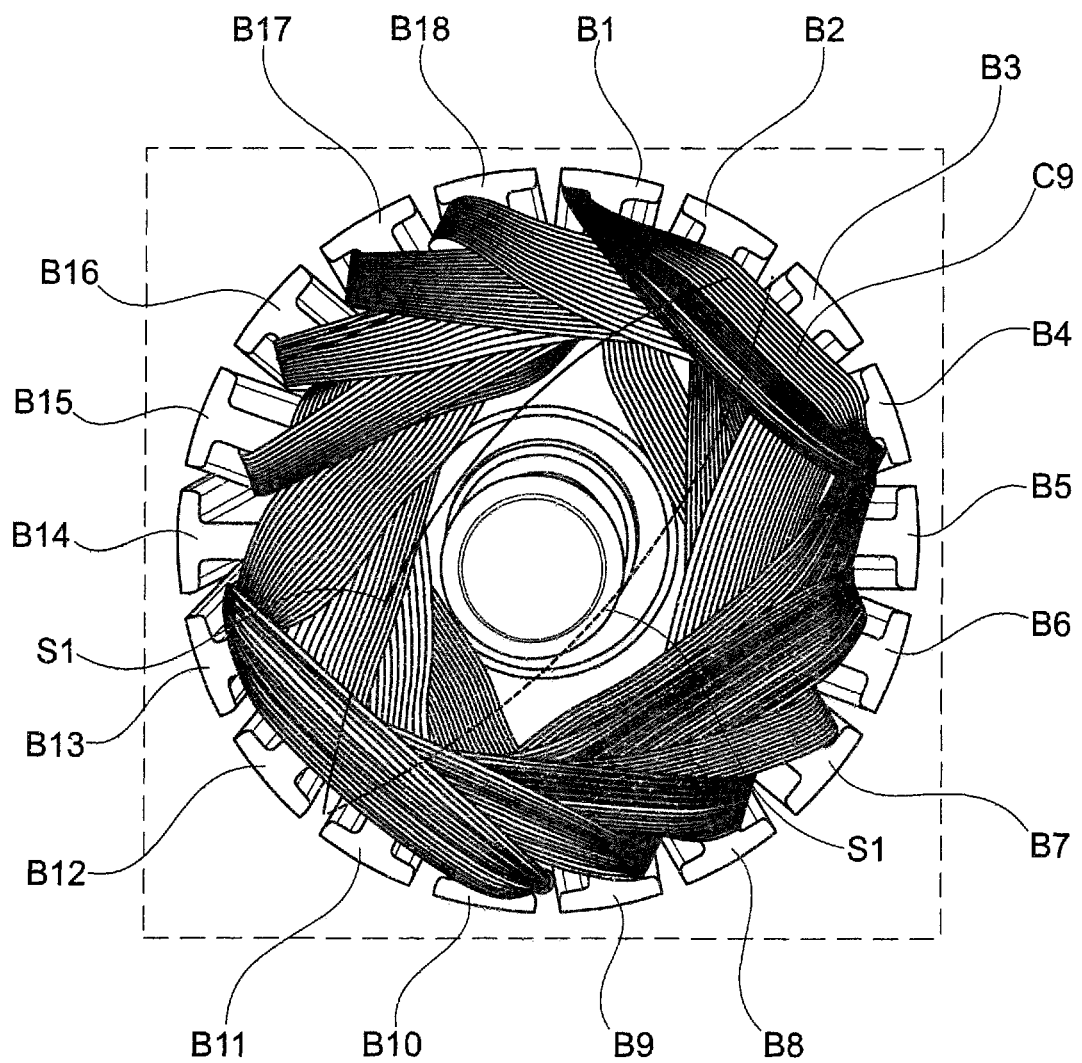
FIG. 10 is a diagram of a wound rotor according to a seventh embodiment.

FIG. 10 depicts a configuration in which, the additional retaining turn is wound around nine arms of the body 3. Thus, the last coil C9 is wound around the arms B1, B2, B3 and B4, and the additional retaining turn s1 indicated by a line extends between the arms B12, B13, B14, B15, B16, B17, B18, B1 and B2. Alternatively, the additional retaining turn s1 may equally be wound around the arms B3, B4, B5, B6, B7, B8, B9, B10 and B11, as indicated schematically in dotted line.

For the other series of coils, the winding solutions for the additional retaining turn are the same as for the first series of coils. This then is the situation in which there are two additional retaining turns corresponding to the two positions described.

Alternatively, in the case of FIG. 10, a single additional retaining turn according to one of the two positions described can be used to retain the two last coils of the two series C9 and C9'.

It should also be noted that the present invention is not restricted to the configurations described but extends to cover all configurations comprising at least one additional retaining turn partially overlapping the turns of the last coil C9, C9' to prevent these from slipping off when the rotary electric machine is in use. Features of one of the embodiments can be combined with features of another embodiment; hence, the additional turn S1 associated with the coil C9 can be wound around four arms as depicted in FIG. 4, whereas the additional turn S1' associated with the coil C9' may be wound around five arms as depicted in FIG. 5.

Figure 11:
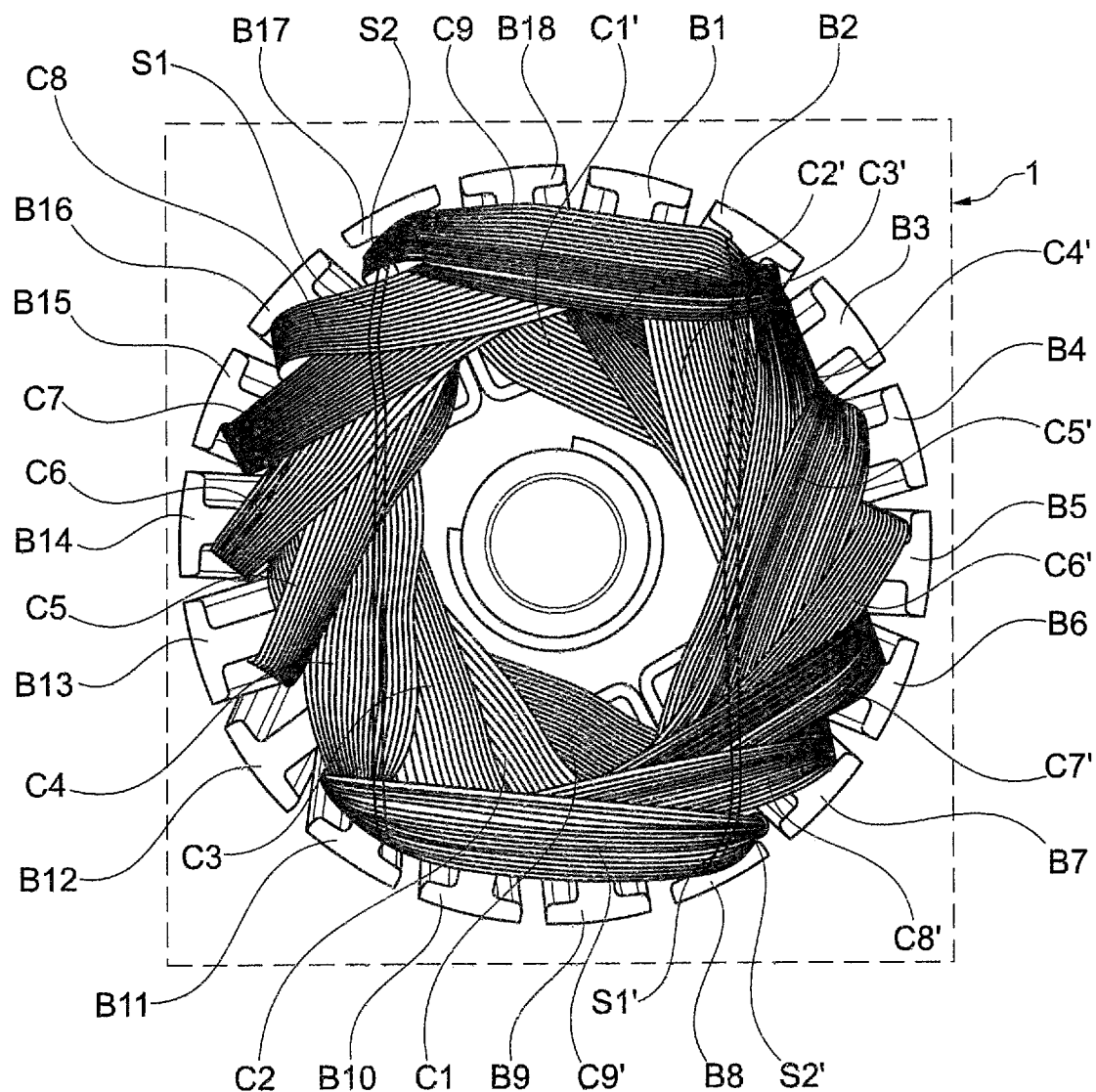
FIG. 11 is a diagram of a wound rotor according to an eighth embodiment.
Figure 12:
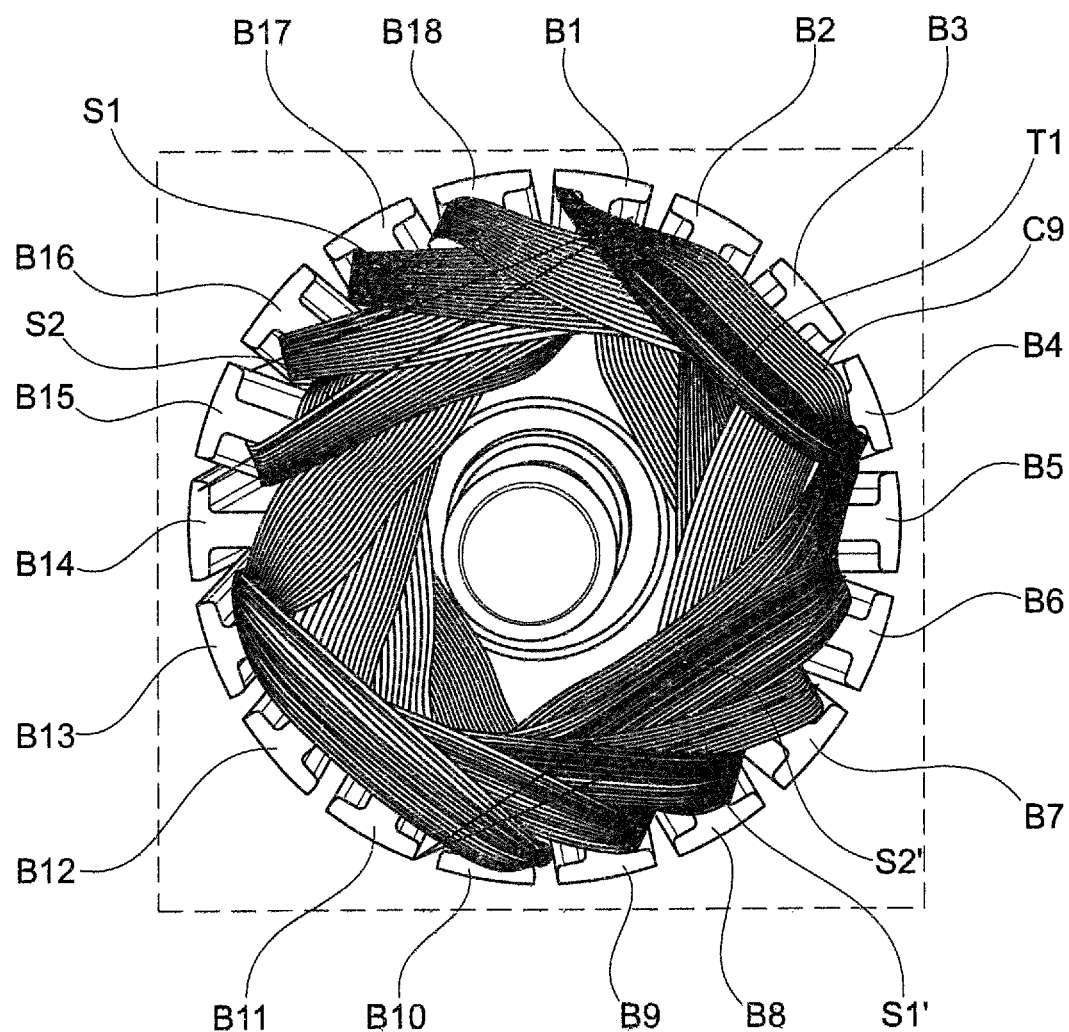
FIG. 12 is a diagram of a wound rotor according to a ninth embodiment.

The series of coils may equally comprise several additional retaining turns, for example two additional retaining turns, as depicted in FIG. 11, in which the two additional turns are denoted S1 and S2. In that example, the two turns S1 and S2 are wound around the same arms and in the same direction of winding, although it is equally possible to have a first additional turn in a first position and a second additional turn in a second position different from the first, as depicted in FIG. 12. Thus, the additional turns may adopt one of the positions described from FIGS. 4 to 9, as well as other positions that make it possible to prevent the turns of the last coil C9, C9' from slipping off. The number of additional turns may also be greater than two. In addition, as for the previous embodiment comprising a single additional retaining turn, it is possible for only the additional retaining turn(s) of one of the series of coils to be used to retain the turns of the last coils C9, C9' of the series. As indicated previously, it is equally possible to have a rotor comprising a number of series of coils higher than two, for example four series positioned 90° apart. In that case, the additional turn or turns may partially overlap the turns of the last coils of two series.

As indicated previously, the number of series of coils of the rotor 1 is not necessarily restricted to one or two but may also be a higher number. FIG. 13 depicts a rotor 1 comprising four series of coils respectively denoted C1 . . . C9, C1' . . . C9', C1" . . . C9" and C1'" . . . C9'" and positioned 90° apart. Each coil C1 . . . C9'" is wound around four arms B1 . . . B18 of the rotor 1. Each series of coils comprises nine coils and the adjacent coils of one series are angularly offset with partial overlap as in the embodiments described hereinabove. The coils C1' . . . C9' of the second series are respectively diametrically opposite the coils of the first series C1 . . . C9 whereas the coils of the fourth series C1' . . . C9'" are respectively diametrically opposite the coils of the third series C1" . . . C9". In addition, the additional turn or turns may be arranged in such a way as to at least partially overlap the turns of the last coils of two of the series of coils.

In the case of FIG. 13, one or more additional retaining turns may be wound around the arms around which the turns of the last coils of the diametrically opposite series are wound, as indicated by the lines T1 and T2.

Alternatively, one or more additional retaining turns may be wound around the arms around which the turns of the last coils of two adjacent series are wound, as indicated by the lines T1' and T2' in FIG. 14, the coilset of which is in other respects identical to the coilset of FIG. 13.

Other locations for the additional turn or turns allowing retention of the turns of the last coils of the various series are equally possible.

According to a second embodiment, the additional retaining loop is produced by a connecting wire intended to connect two of the terminals V1 ... V18 of the slip-ring 11. Specifically, as indicated previously, the coils C1 ... C9''' are connected to the terminals of the slip-ring 11 in order to allow these to be supplied with power. However, in the case of electric motors 1 comprising four or more poles with just two brushes, short-circuits are used to supply power to the coils of all the poles. These short-circuits are connections between the terminals V1 ... V18 of the slip-ring 11 for which two brushes will supply the same power at the same moment. For example, in the case of a motor comprising four brushes arranged 90< apart, the two diametrically opposite brushes supply the same voltage and so it is possible to dispense with one of these two brushes and to connect the diametrically opposite terminals of the slip-ring 11 by conducting connecting wires also referred to as "straps".

Figure 16:
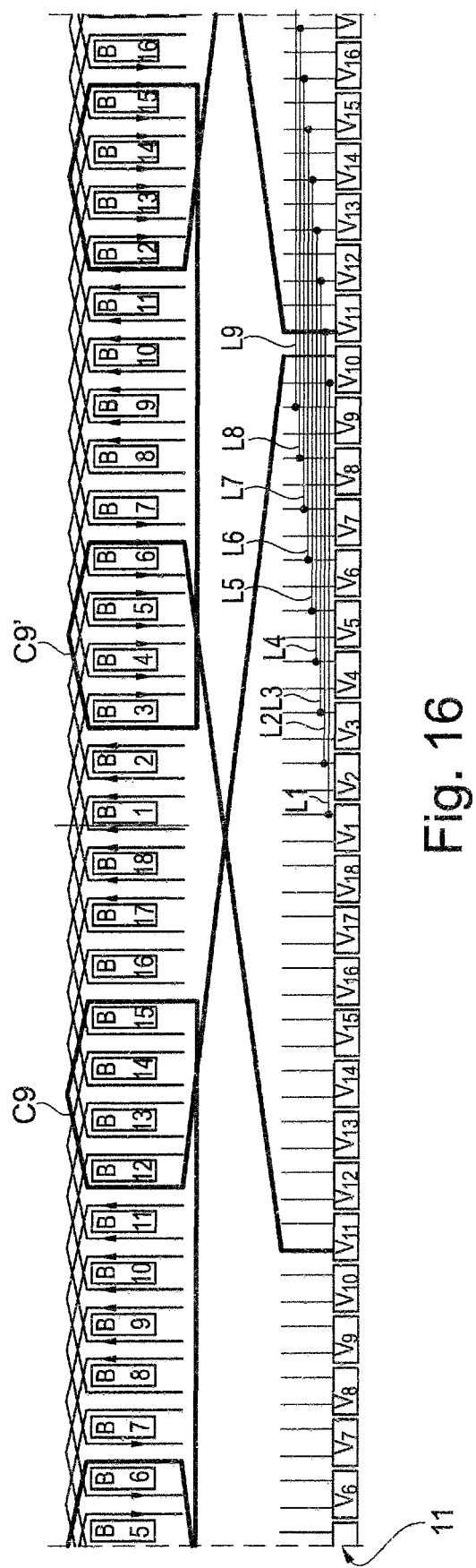
FIGS. 16 and 17 are schematic projected plan views of a rotor according to a first and second winding configuration.

FIG. 16 depicts a plan projection of a rotor 3. The upper part of the figure depicts the arms B1 ... B18 of the rotor 3 and the bottom part depicts the terminals V1 ... V18 of the slip-ring 11. The location of the turns of the coils are indicated by arrowed lines, the arrow indicating the direction of winding of the turns. However, it should be noted that the coils are indicated only in part (the connections to the terminals of the slip-ring 11 are indicated only for the last coils C9 and C9'). In the case of FIG. 16, the last coil C9 of the first series is wound around the arms B12, B13, B14 and B15, and the last coil C9' of the second series is wound around the arms B3, B4, B5 and B6. In addition, the two last coils C9 and C9' are connected in series between the terminals V10 and V11 of the slip-ring 11 (the equivalent (first, second ... ) coils of the series are all connected in series between two terminals of the slip-ring 11). It should be noted that the coils C1 ... C9' may also be connected in parallel between two terminals of the slip-ring 11.

Furthermore, the rotor 3 comprises connecting wires L1, L2 ... L9 connecting the opposite terminals of the slip-ring 11. The connecting wire L1 connects the terminals V1 to V10, the connecting wire L2 connects the terminals V2 to V11 ... the connecting wire L9 connects the terminals V9 to V18. The connecting wires make it possible to reduce the number of brushes used.

Figure 17:
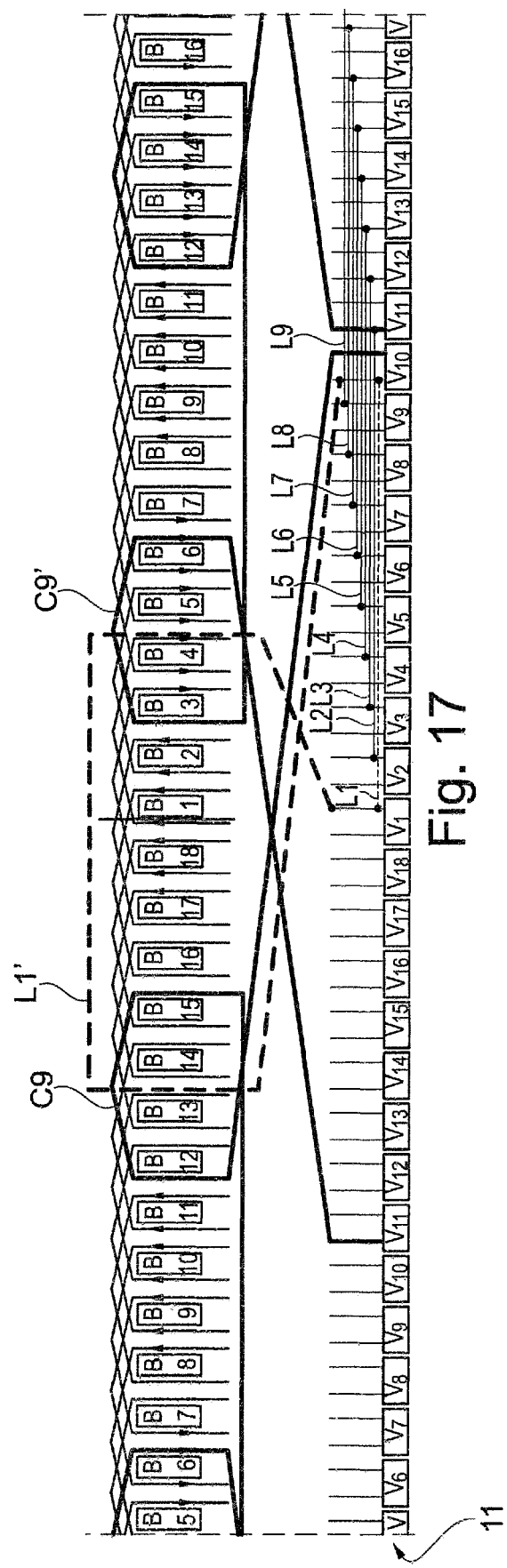

Thus, with such a configuration, it is possible to have at least one of these connecting wires L1 ... L9 pass around at least two arms of the rotor in such a way as to at least partially overlap the turns of the last coil C9, C9' of one or more series so as to hold these turns in position. Such an embodiment is depicted in FIG. 17 by the connecting wire L1' (indicated in dotted line), which then replaces the wire L1 (likewise depicted in dotted line). The connecting wire L1' passes between the arms B4 and B5 in such a way as to overlap the turns of the last coil C9' and between the arms B13 and B14 in such a way as to overlap the arms of the last coil C9. Obviously, it is possible to use other positionings of the connecting wire L1' provided that these positionings allow a partial overlapping of the turns of at least one of the last coils C9, C9'. The connecting wire L1' connects the terminals V1 and V10 of the slip-ring like the connecting wire L1 in FIG. 16. The other connecting wires L2 ... L9 remain identical to the connecting wires L2 ... L9 of FIG. 16. However, it is possible to produce loops for retaining the turns of the last coils C9, C9' by using several connecting wires.

In addition, according to an alternative embodiment which has not been depicted, the loop formed by the connecting wire L1' may form two windings around at least two arms, the two windings being wound in opposite directions to one another in order to compensate for the tension induced as a result of the asymmetry of the loop formed by the connecting wire L1'. For preference, the retaining loop or loops are wound around a number of arms B1 ... B18 of the rotor 1 to cover an angle substantially equal to 2 pole pitches, namely between eight and ten arms B1 ... B18 in the case of an electric motor comprising four poles and a rotor 1 comprising eighteen arms B1 ... B18.

The retaining loop may also be formed by any wire or element at least partially overlapping the turns of the last coil of at least one series and that can be fixed to the slip-ring 11 at its ends in such a way as to hold the turns of the last coil in position. Attachment is not restricted to a soldered attachment but covers any type of attachment known to those skilled in the art.

Figure 15:
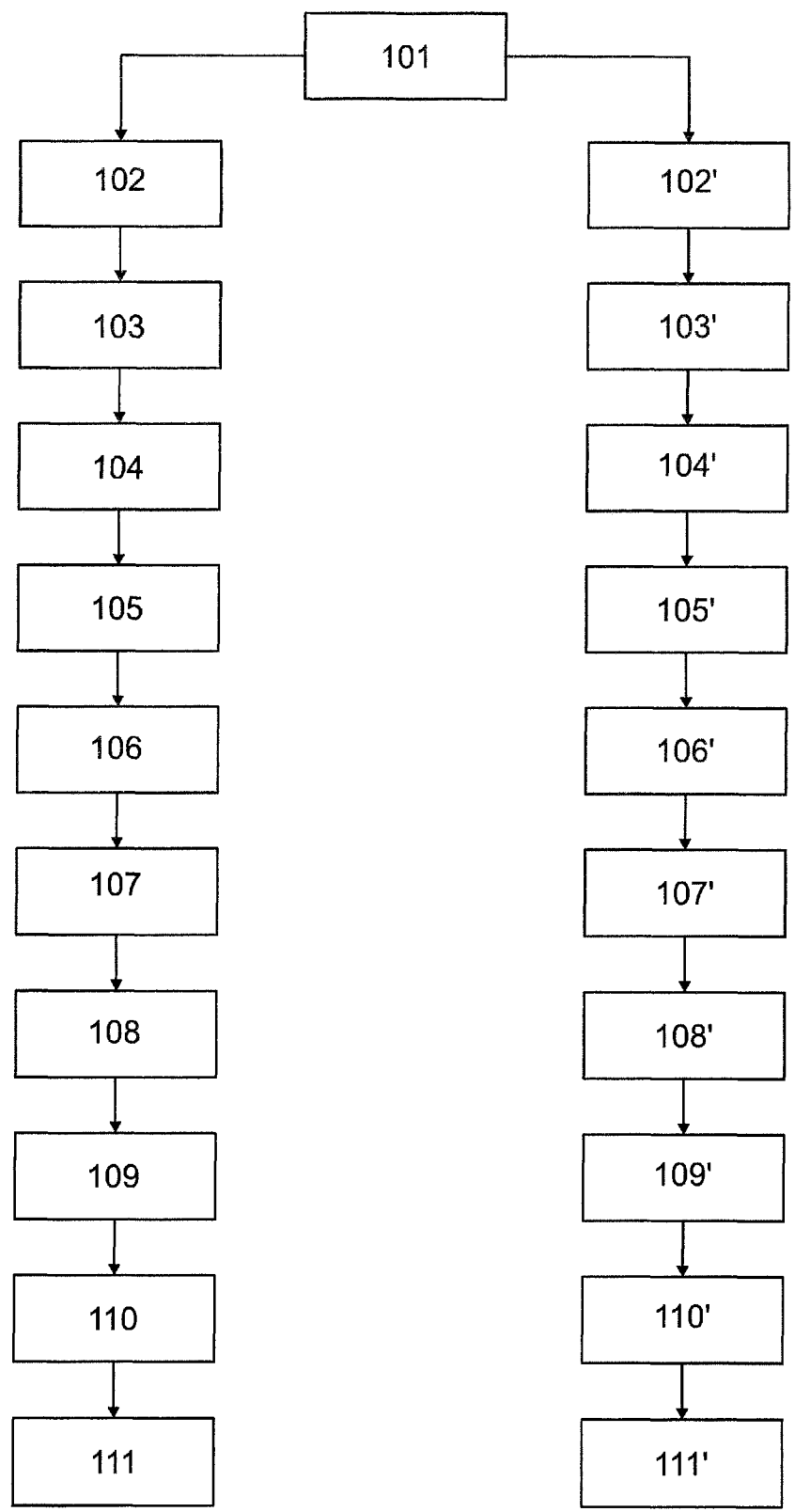
FIG. 15 is a flowchart of the various steps in the manufacture of a wound toothed rotor 18 according to the present invention.

FIG. 15 depicts the various steps in the manufacture of the rotor 1.

The first step 101 is to manufacture the body 3. As indicated previously, this body 3 can be made from a stack of laminations joined together. The first step for example involves a first sub-step of cutting the laminations to the desired shape, notably according to the number of arms of the body 3, and a second sub-step of fixing the laminations together, for example by clipping, soldering or bonding.

The method next comprises a succession of steps 102 to 110 for the creation of the coilset, each step corresponding to a winding of a predetermined number, for example 30, of turns around a plurality of arms to form a coil C1 ... C9'''. If the coilset comprises just one series of coils, then two successive winding steps are performed around at least one common arm and at least one distinct arm so that two adjacent coils are angularly offset from one another with a partial overlap. The various windings corresponding to the various coils being done in the same direction of winding. Thus, step 102 for example corresponds to the creation of a coil C1 around the arms B9, B10, B11 and B12 (as indicated in FIG. 3) and step 103 for example corresponds to the creation of the coil C2 around the arms B10, B11, B12 and B13. The turns of the coil C2 therefore overlap the turns of the coil C1 on the arms B10, B11, and B12.

In addition, in the event that the rotor 1 comprises several series of coils, notably two series as in the case of the rotor of FIG. 3, the method comprises a second succession of steps 102' to 110' which can be performed respectively simultaneously with the steps 102 to 110. Step 102' therefore corresponds to the creation of the coil C1' around the arms B18, B1, B2 and B3 (as indicated in FIG. 3) and step 103' therefore corresponds to the creation of the coil C2' around the arms B1, B2, B3 and B4. The turns of the coil C2' therefore overlap the turns of the coil C1' on the arms B1, B2, and B3. Creating several series of coils simultaneously makes it possible to reduce the time needed to manufacture the coilset of the rotor 1, but does require a machine comprising several turn-winding arms.

Alternatively, steps 102' to 110' may be offset temporally with respect to steps 102 to 110.

In addition, several series of coils, for example the two series of coils in FIG. 3, may be produced using a machine that comprises just one winding arm. In that case, the coils of the various series are formed in alternation, the method comprises step 102 of forming the first coil of the first series, then step 102' of forming the first coil of the second series, then step 103 of forming the second coil of the first series, then step 103' of forming the second coil of the second series, and so on, for all of the coils. The positioning of the coils on the body of the rotor remains the same as with two series of coils produced simultaneously by two winding arms. In the same way, it is possible to obtain a higher number of series of coils, for example four series, as in FIGS. 13 and 14.

The method also comprises a step 111 of winding at least one additional retaining turn as described hereinabove. The number of additional turns is, for example, one turn S1 which is, for example, wound in a direction substantially perpendicular to the turns of the last coil formed in step 110. The direction of winding (or direction of coiling) of the at least one additional turn is preferably the opposite direction to the last coil.

Similarly, a step 111' may also be carried out in order to form one (or more) additional turn(s) S1' associated with the second series of coils. Steps 111 and 111' may be simultaneous in the case of a machine comprising two winding arms.

The additional turns S1 and S1' are for example arranged in such a way as to partially overlap the turns of the last coils C9 and C9' of the two series.

In the case of a rotor 1 comprising four series of coils, the additional turns (T1, T2, T1' and T2' in FIGS. 13 and 14) may be arranged in such a way as to partially overlap the turns of the last coils C9, C9', C9'', C9''' of two series.

Thus, the use of at least one additional retaining turn makes it possible to avoid the turns of the last coil of a series slipping off, thereby making it possible to keep a rotor of reduced diameter while at the same time ensuring correct operation of the electric motor. In addition, an additional turn can be used to retain the turns of two last coils if the rotor comprises several series of coils.

The invention claimed is:

1. A rotor of a rotary electric machine, comprising:
  a body comprising a cylindrical central core and a circumferential plurality of arms extending radially out from the cylindrical central core, the body being mounted with an ability to move about an axis of rotation;
  a coilset produced by windings of turns and forming at least one series of coils,
  a coil comprising a predetermined number of turns around at least two arms of the body, two adjacent coils of a series being angularly offset from one another with a partial overlap; and
  at least one additional retaining turn wound around at least two arms of which at least one is common to the arms around which is wound the last coil, situated radially outermost, of at least one series and of which at least one is distinct from the arms around which the said last coil is wound, so that the at least one additional retaining turn partially overlaps the turns of the said last coil,
  wherein the rotor comprises two series of coils arranged at 180° with respect to one another and with respect to the axis of rotation,
  wherein the two series of coils each comprises the at least one additional retaining turn, and each of the at least one additional retaining turn extends from one series of the two series of coils to the other series of the two series of coils.

2. The rotor according to claim 1, in which one single series of coils comprises at least one additional retaining turn partially overlapping the turns of the last coils of the two series of coils.

3. The rotor according to claim 1, in which the at least one additional retaining turn of at least one series of coils is produced between a plurality of arms, the plurality of arms comprising:
  a first arm around which the last coil of the series is wound, and
  a second arm around which the last coil of another series of coils is wound, the at least one additional retaining turn of the series of coils partially overlapping the turns of the last coils of the series of coils.

4. The rotor according to claim 1, in which the at least one additional retaining turn extends in a direction substantially equal to an angle of 360° divided by a number of poles of the rotary machine with respect to the direction of the turns of the last coil of a series.

5. The rotor according to claim 1, configured to collaborate with a stator of the rotary electric machine comprising a number of poles greater than or equal to four.

6. The rotor according to claim 5, in which an angle covered by the arms around which a coil is wound is substantially equal to 360° divided by the number of poles of the stator of the rotary electric machine.

7. The rotor according to claim 1, comprising a slip-ring provided with a plurality of terminals and configured to supply power to the coils of the rotor and wherein the additional retaining turn is a connecting wire connecting two terminals of the slip-ring.

8. A method of manufacturing a rotor of a rotary electric machine comprising a body having a cylindrical central core and a circumferential alternation of arms extending radially out from the cylindrical central core, the body being intended to be mounted with an ability to move about an axis of rotation, the method comprising:
  a succession of steps of winding a predetermined number of turns of a coilset around at least two arms of the body to form at least one series of coils, the winding steps being performed in such a way that two adjacent coils of a series are wound around at least one common arm and at least one distinct arm, two adjacent coils of a series being angularly offset from one another with a partial overlap,
  an additional step of winding at least one additional retaining turn of the coilset around at least two arms of the body, of which arms at least one is common to the arms around which is wound the last coil of a series, situated radially outermost, and the other arm is distinct from the arms around which the last coil of a series is wound, the said at least one additional retaining turn partially overlapping the turns of the said last coil,
  wherein the rotor comprises two series of coils arranged at 180° with respect to one another and with respect to the axis of rotation,
  wherein the two series of coils each comprises at least one additional retaining turn, and each additional retaining turn extends from one series of the two series of coils to another series of the two series of coils.

9. The method of manufacture according to claim 8, in which the successive winding steps are performed in duplicate and simultaneously at a first place on the body and at a second place on the body that is diametrically opposite the first place so as to form two series of coils which are symmetric about the axis of rotation.

* * * * *

UNITED STATES PATENT AND TRADEMARK OFFICE
CERTIFICATE OF CORRECTION

| | | |
|---|---|---|
| PATENT NO. | : 10,923,976 B2 | Page 1 of 1 |
| APPLICATION NO. | : 16/234696 | |
| DATED | : February 16, 2021 | |
| INVENTOR(S) | : Jose-Luis Herrada et al. | |

It is certified that error appears in the above-identified patent and that said Letters Patent is hereby corrected as shown below:

On the Title Page

In the Abstract:
At item (57), Line numbers 20-21, "(C9, C9', C9", C9")" should read -- (C9, C9', C9",C9''') --.

In the Specification

At Column 8, Line numbers 48-49, the phrase "fourth series C1'…" should read
-- fourth series C1'''… --.

Signed and Sealed this
Twenty-fifth Day of May, 2021

Drew Hirshfeld
*Performing the Functions and Duties of the
Under Secretary of Commerce for Intellectual Property and
Director of the United States Patent and Trademark Office*